(12) United States Patent
Baxter et al.

(10) Patent No.: US 10,329,182 B2
(45) Date of Patent: Jun. 25, 2019

(54) METHOD FOR SEPARATING SOLIDS SUSPENDED OR ENTRAINED IN A LIQUID

(71) Applicants: Larry Baxter, Orem, UT (US); Andrew Baxter, Spanish Fork, UT (US); David Frankman, Provo, UT (US); Skyler Chamberlain, Provo, UT (US); Kyler Stitt, Lindon, UT (US)

(72) Inventors: Larry Baxter, Orem, UT (US); Andrew Baxter, Spanish Fork, UT (US); David Frankman, Provo, UT (US); Skyler Chamberlain, Provo, UT (US); Kyler Stitt, Lindon, UT (US)

(73) Assignee: Sustainable Energy Solutions, LLC, Orem, UT (US)

( * ) Notice: Subject to any disclaimer, the term of this patent is extended or adjusted under 35 U.S.C. 154(b) by 9 days.

(21) Appl. No.: 15/385,056

(22) Filed: Dec. 20, 2016

(65) Prior Publication Data
US 2018/0170783 A1   Jun. 21, 2018

(51) Int. Cl.
*C02F 1/00* (2006.01)
*C02F 11/125* (2019.01)
(Continued)

(52) U.S. Cl.
CPC ............ *C02F 11/125* (2013.01); *B01D 29/23* (2013.01); *B01D 29/25* (2013.01); *B01D 29/828* (2013.01); *B01D 36/001* (2013.01)

(58) Field of Classification Search
CPC ........ B01D 29/01; B01D 29/05; B01D 29/23; B01D 33/073; B01D 33/27; B01D 33/35; B01D 33/76; B01D 36/001; B01D 53/00; B01D 53/02; B01D 53/14; B01D 53/22; B01J 19/18; B01L 3/50255; B01L 2400/049; C02F 1/00
(Continued)

(56) References Cited

U.S. PATENT DOCUMENTS

| | | | | |
|---|---|---|---|---|
| 5,419,138 A | * | 5/1995 | Anderson | B01J 2/20 62/341 |
| 5,637,216 A | * | 6/1997 | Dillier | B01D 29/012 210/335 |

(Continued)

OTHER PUBLICATIONS

JP2008183506 Bono—Centrifugal separator, and method for controlling centrifugal separator (Abstract & MT; Aug. 14, 2008; 33 pages).*

*Primary Examiner* — Hayden Brewster (57) ABSTRACT

A method of separating solids from a slurry or suspension is disclosed. The method includes: providing a slurry or suspension containing solids and liquid to an input port of a first side of a filter, the filter providing a filtering size between 2 microns and 70 microns; providing a liquid discharge port on a second side of the filter which receives the liquid that passes through the filter; and separating the solids from the liquid by pressing the solids into a pressure regulating solids discharge port on the first side of the filter, thereby compacting solids on the first side of the filter, forcing at least some of the liquid of the slurry or suspension through the first side of the filter to the second side of the filter causing pressure regulated solids to be discharged through a pressure regulating solids discharge port into a pressurized chamber.

11 Claims, 10 Drawing Sheets

(51) Int. Cl.
*B01D 36/00* (2006.01)
*B01D 29/23* (2006.01)
*B01D 29/25* (2006.01)
*B01D 29/82* (2006.01)
*B01D 53/00* (2006.01)

(58) Field of Classification Search
USPC ....... 62/617; 95/45, 190, 229, 290; 210/179, 210/252, 370, 374, 767, 808; 422/187
See application file for complete search history.

(56) References Cited

U.S. PATENT DOCUMENTS

| | | | | |
|---|---|---|---|---|
| 5,833,851 A | * | 11/1998 | Adams | B01D 29/118 |
| | | | | 210/413 |
| 2009/0056542 A1 | * | 3/2009 | Carew | A01K 63/045 |
| | | | | 95/108 |
| 2012/0180657 A1 | * | 7/2012 | Monereau | B01D 53/002 |
| | | | | 95/45 |
| 2012/0301800 A1 | * | 11/2012 | Carew | A01K 63/045 |
| | | | | 429/416 |
| 2018/0259251 A1 | * | 9/2018 | Poorte | B01D 43/00 |

\* cited by examiner

METHOD FOR SEPARATING SOLIDS SUSPENDED OR ENTRAINED IN A LIQUID

This invention was made with government support under DE-FE0028697 awarded by The Department of Energy. The government has certain rights in the invention.

BACKGROUND

Field of the Invention

The present invention relates to separation of solids suspended in liquids as in a slurry or suspension. Our immediate interest is in a slurry or suspension of solid $CO_2$ particles suspended in a liquid at temperatures below ambient, but this process has much broader application.

Related Technology

As cold processing technology becomes more prevalent, new methods of separating solids from liquids in a cold suspension are needed.

United States patent publication number 2012/0180657 to Monereau et al. teaches a method for producing at least one gas having a low $CO_2$ content and at least one fluid having a high $CO_2$ content. This disclosure is pertinent and could benefit from separation methods disclosed herein and is hereby incorporated by reference in its entirety for all that it teaches.

United States patent publication number 2014/0144178 to Terrien et al. teaches optimized heat exchange in a $CO_2$ de-sublimation process. This disclosure is pertinent and could benefit from separation methods disclosed herein and is hereby incorporated by reference in its entirety for all that it teaches.

United States patent publication number 2016/0290714 to Baxter et al. teaches optimized heat exchange in a $CO_2$ de-sublimation process. This disclosure is pertinent and could benefit from separation methods disclosed herein and is hereby incorporated by reference in its entirety for all that it teaches.

SUMMARY

A method of separating solids from a slurry or suspension is disclosed. The method includes: providing a slurry or suspension containing solids and liquid to an input port of a first side of a filter, the filter providing a filtering size large enough to allow the liquid to pass but small enough to contain the solids, which is commonly between 2 microns and 70 microns; providing a liquid discharge port on a second side of the filter which receives the liquid that passes through the filter; and separating the solids from the liquid by pressing the solids into a pressure regulating solids discharge port on the first side of the filter, thereby compacting solids on the first side of the filter at a predetermined pressure, forcing at least some of the liquid of the slurry or suspension through the first side of the filter to the second side of the filter causing pressure regulated solids to be discharged through the pressure regulating solids discharge port into a pressurized chamber.

The filter may be constructed of mesh, stainless steel, metal, ceramic, carbon, fibrous material, plastic, diamond, an interstitially formed material, or a combination thereof. The solids may be mechanically compacted or compressed using a motor in combination with a screw drive, piston, tapered wedge, gear system, screw gears, cam or a combination thereof. The predetermined pressure created by a solids compactor or solids compressor may be between 4 Bar and 10 Bar. The predetermined pressure may be dynamically set or changed based on an instantaneous temperature of the slurry or suspension. One or more process ports may be in communication with the first side of the filer and/or the second side of the filter. A temperature sensor or pressure sensor may be inserted into the one or more process ports. A mesh filter may be a sintered mesh filter with two or more mesh screens sintered together, each mesh screen may have a filtering size large enough to allow the liquid to flow through but small enough to contain the solid, which may commonly be between 2 microns and 70 microns. An actuator may be connected to a pressure regulating solids discharge port. The actuator may be a pneumatic, hydraulic, hydronic, or motorized actuator. The pressure regulating solids discharge port may be formed by a tapered channel, an orifice, or a springing valve. The actuator may use an actuator arm to provide back pressure on the solids while the solids are compacting. A filter housing may provide a frame which connects the input port to the first side of the filter. The frame may additionally connect the liquid discharge port to the second side of the filter. The frame may additionally connect the pressure regulating solids discharge port to a pressurized chamber for melting the solids. The pressurized chamber may have one or more process ports in communication with the solids or the melted solids within the pressurized chamber. The frame may comprise a gas discharge port. The gas discharge port may control a pressure on the second side of the filter. The gas discharge port may be located in a plane with the liquid discharge port which bisects the filter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
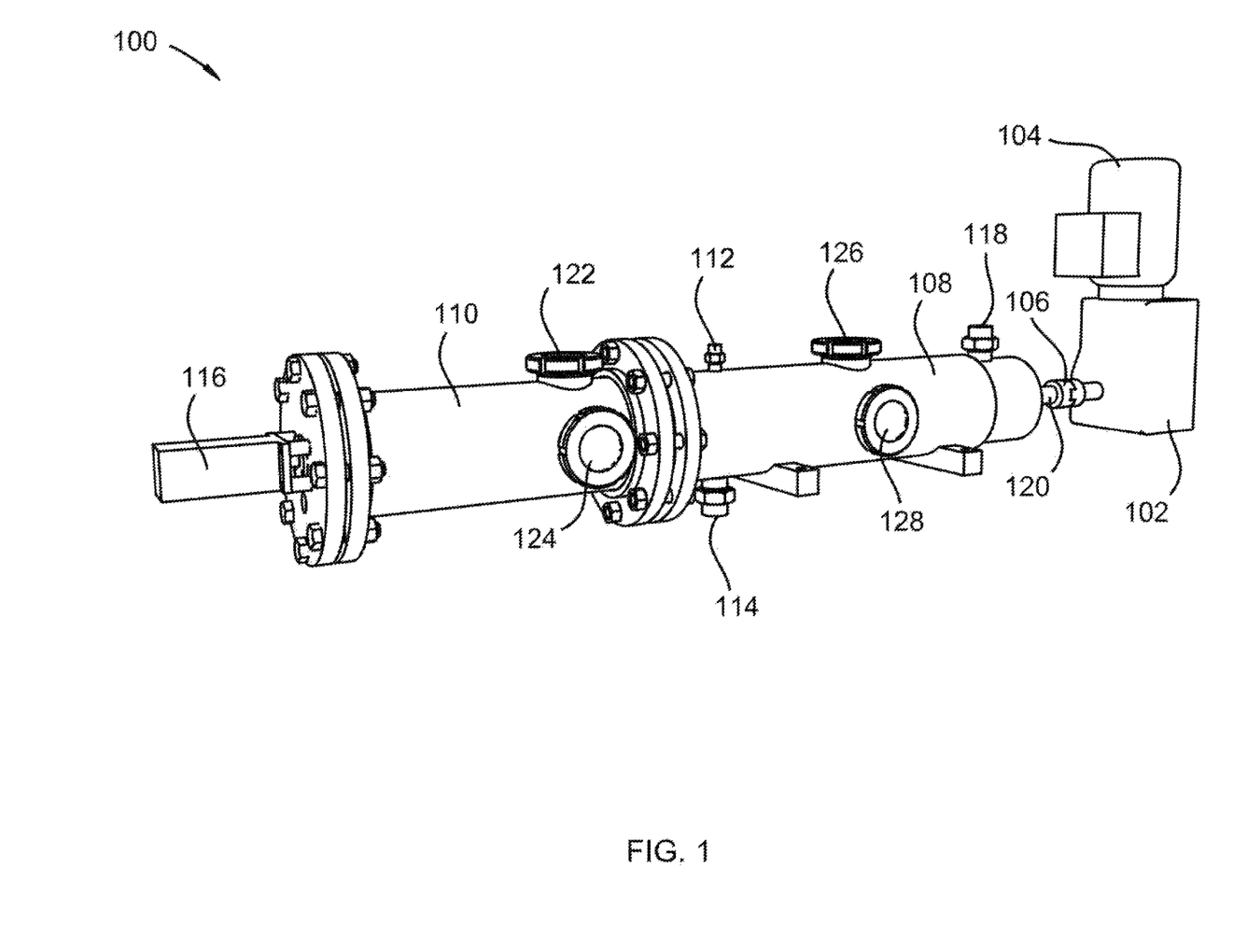
FIG. 1 shows a prospective view of a solids separation apparatus in accordance with an embodiment of the invention.

Referring to FIG. 1, a solids separation apparatus 100 is shown. Apparatus 100 contains a slurry or suspension input port 118 attached to a filter housing 108. Input 118 receives cold solids suspended in a liquid at temperatures below the solids melting or dissolution point, which is below −56.6° C. in the case of $CO_2$. A slurry or suspension may be formed by cooling of one or more slurry or suspension liquids to temperatures below −56° C. with one or more condensable materials present in the liquid, the condensable materials forming solids at temperatures below −56° C. The condensable materials may be post-combustion materials or flu gas materials. Well-known refrigeration processes may be used to cool the slurry or suspension liquids to temperatures below −56° C. Motor 104 may be used in combination with gear box 102, drive coupler 106, and drive shaft 120 to compact or compress solids within the slurry or suspension on a first side of a filter (shown in FIG. 2) within filter housing 108. Process ports 126, 128 are shown attached to filter housing 108. Process ports 126, 128 may be used for process monitoring, process instrumentation, process sensors, etc. Process sensors may include temperature sensors, pressure sensors, vibration sensors, ultrasonic sensors, level sensors, photo sensors, cameras, etc. Filter housing 108 forms a frame which supports input port 118, liquid discharge port 114 and gas discharge 112. The frame of filter housing 108 may rigidly connect to solids pressure chamber 110 and solids regulator actuator 116. Solids separation apparatus 100 may be configured to melt separated solids within pressure chamber 110.

Figure 2:
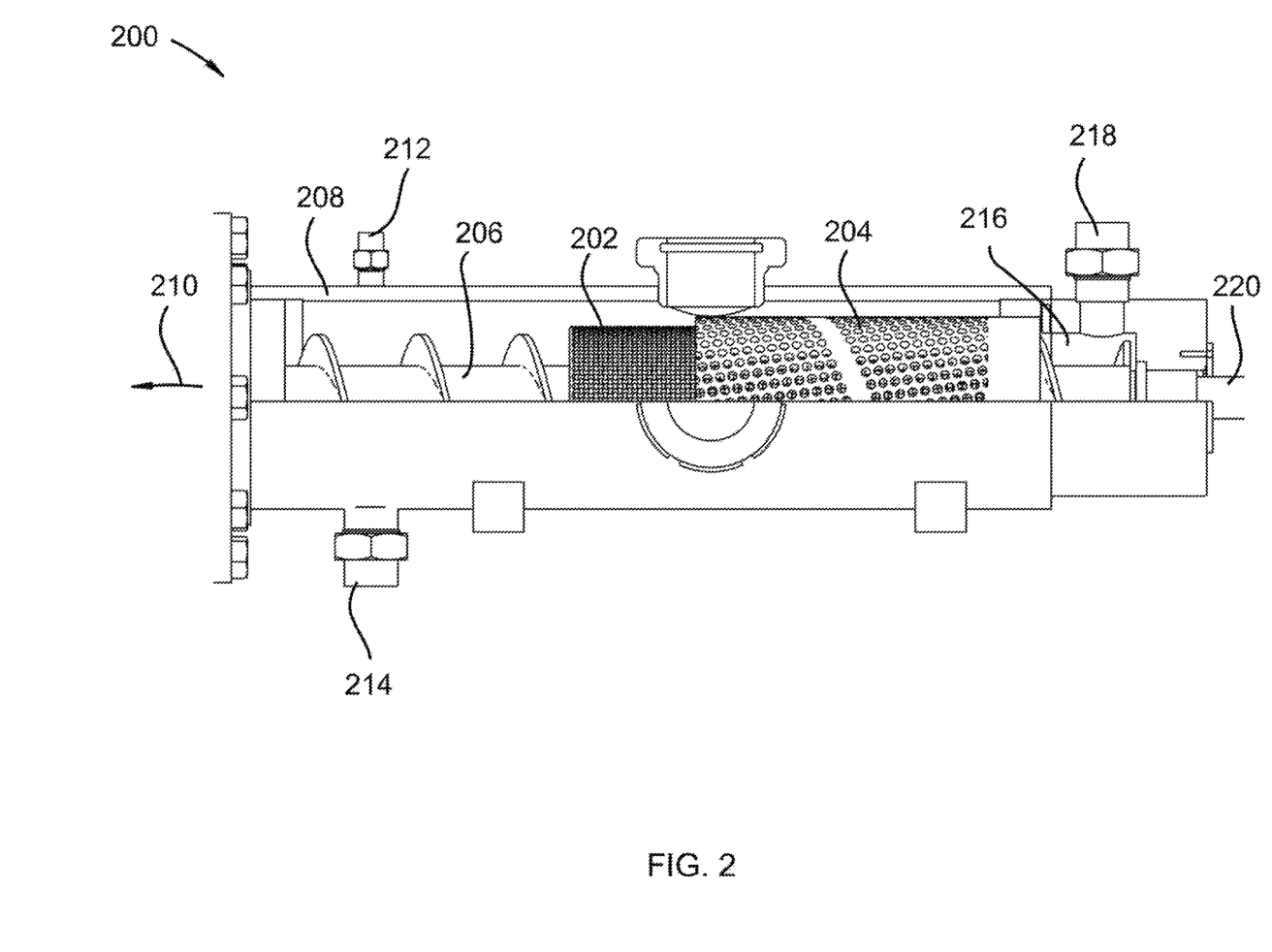
FIG. 2 shows a side cross-sectional view of a solids separation apparatus in accordance with an embodiment of the invention.

Referring to FIG. 2, a cross sectional view of filter housing 108, of FIG. 1, is shown generally at 200. A filter comprising portions 204 and 202 may be housed within filter housing 208 and may surround a solids compacting mechanism 206. Solids compacting mechanism 206 may be driven by a rotational drive shaft 220. Solids compacting mechanism 206 is shown as a helical screw compactor, but other know mechanical solids compactor mechanisms such as pistons, presses, or tapered wedges may be used. Filter portion 202 and/or 204 may be formed as a flat plate or other shape which allow filtering and compacting of solids of a slurry or suspension. Filter portion 202 may be designed to filter particles between 2 microns to 70 microns or sizes greater than 70 microns if the particles remain contained on the first side of the filter. Filter portion 204 may be formed to support internal pressures up to 15 Bar created by solids compacting mechanism 206. Filter housing 208 may form a frame which provides a direct conduit for slurry or suspension to be introduced through input port 218 into area 216 in direct contact with compacting mechanism 206 on a first side of filter portion 202. Some of the liquid contained within the slurry or suspension may immediately be transferred through a first (inner) side of filter portion 202 to a second (outer) portion of filter 202 and through filter portion 204 and out of liquid discharge port 214. Other liquid will be trapped in solids of the slurry or suspension and will be released as the solids are compacted by the solids compacted mechanism 206 and forced into a solids regulator and into pressure chamber 110, 210. A solids pressure regulator located between filter housing 208 and pressure chamber 110, 210 provides back pressure on the solids and regulates a solids pressure on the first side of the filter portion 202 at pressures between 4 Bar to 15 Bar depending on process conditions. Gas discharge port 212 may be used to discharge gas and regulate a pressure on the second side of filter 202, 204. The pressure on the second side of filter 202, 204 may be a negative or positive pressure. A gas flow device may be operably connected to Gas discharge port 212 allowing for both positive and negative pressures to be generated on the second side of filter 202, 204. Pressures on the second side of Filter 202,204 may also oscillate between positive and negative pressures allowing gasses and liquid trapped within the solids to be released and discharged out of Filter housing 108, 208. Filter 202, 204 may be formed of multiple filters such as sintered mesh filters or may be formed as one filter. The filter may be formed of solid ceramic or partially formed of ceramic. A diamond filter may be created by interstitially formed pores with filtering dimensions between 2 microns and 70 microns. Other known filters, having the capacity to separate small solid particles from a liquid while under pressure, may also be used.

Figure 3:
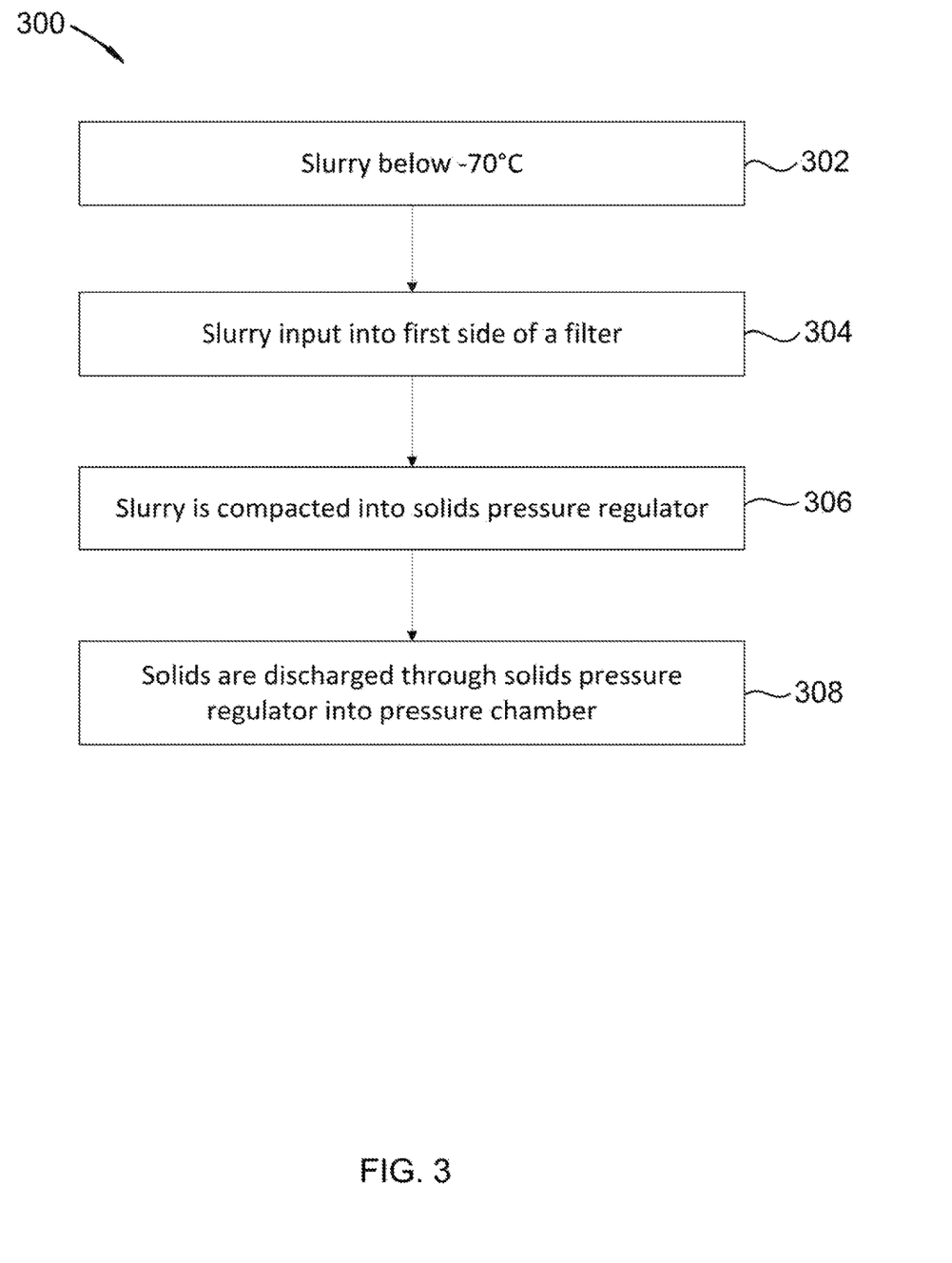
FIG. 3 is flow chart of a method for solids separation in accordance with an embodiment of the invention.

Referring to FIG. 3, a method flow for separating a solid from a slurry or suspension is described. At steps 302 and 304, a slurry below a temperature of −56° C. is provided to an input port of a solids separation apparatus. At step 306, the slurry is compacted into a solids pressure regulator to pressures between 4 Bar and 15 bar forcing liquid trapped or entrained within the solids out of the solids and pressurizing the solids before entry into a pressure chamber. This step is also important for creating a seal between the solids pressure chamber and the filter housing. Some of the solids discharged into the pressure chamber will melt and create a gas pressure within the solids chamber. The compacted solids may form a seal keeping out gas produced by melting of the solids within the pressure chamber. At step 308, the solids are discharged through a solids pressure regulator into a pressure chamber. The pressure chamber may be pressurized to pressures at or below a setpoint of the solids pressure regulator.

Figure 4:
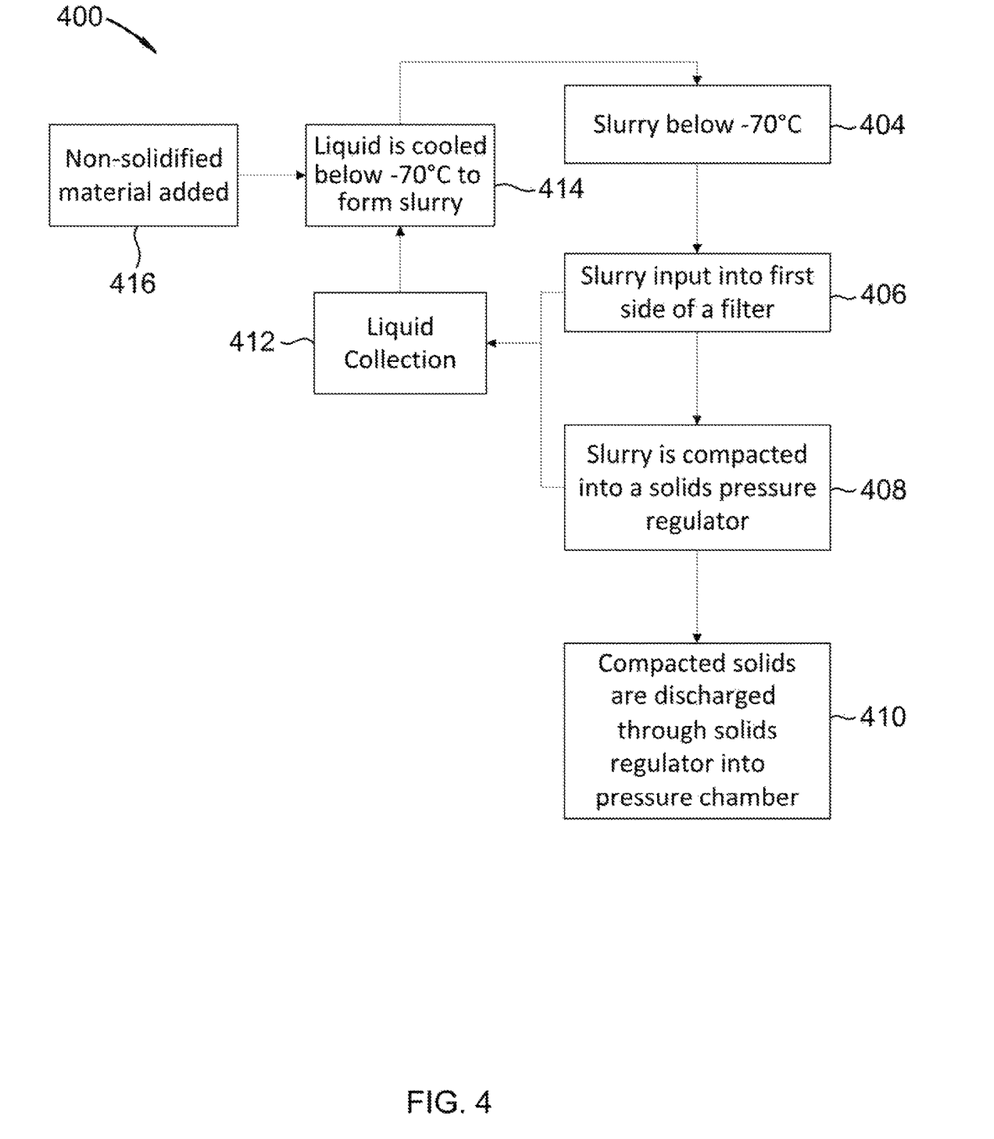
FIG. 4 charts the flow of a method for solids separation in accordance with an embodiment of the invention.

Referring to FIG. 4, a method flow 400 for separating a solid from a slurry is described. At step 416, non-solidified material such as post-combustion materials or flu gas materials are added to a cold liquid to form a slurry of condensed or desublimated solids formed from the post-combustion materials or the flu gas materials. When the slurry is formed, and is below −56° C. at step 404 it is transferred to an input to a first side of a filter 406. The transfer may be by way of a pipe or conduit. The pipe or conduit may be insulated to help prevent heat transfer. At step 408, the slurry is compacted in a solids pressure regulator until a predetermined or preset compacted solids pressure is reached. One the predetermined or preset pressure is reached the compacted solids are discharged through the solids regulator into the pressure chamber 410. As the slurry is compacted liquids are released and collected 412 and cooled and combined with the original cooling liquid used to cool the non-solidified material.

Figure 5:
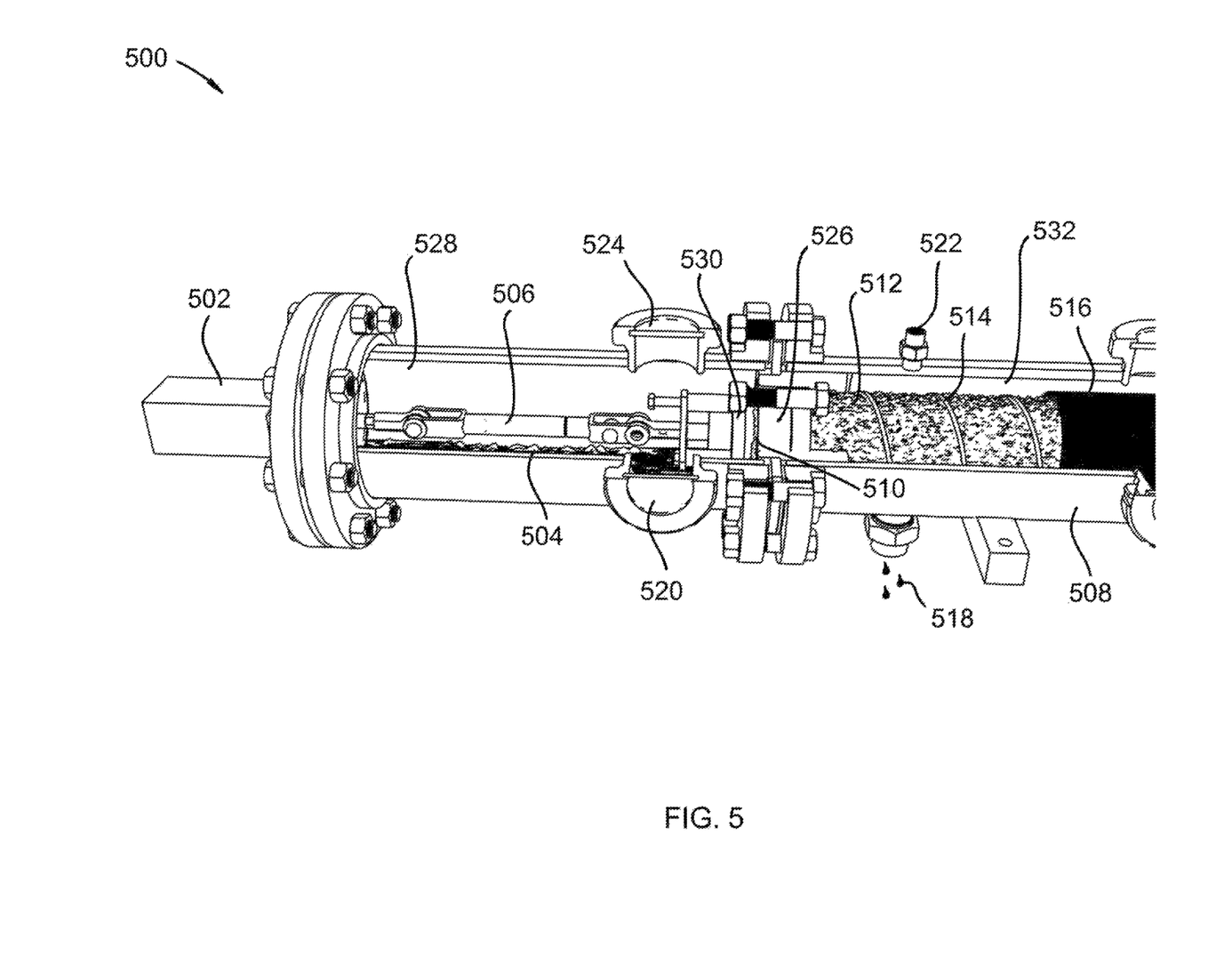
FIG. 5 shows a prospective cross-sectional view of a solids separation apparatus in accordance with an embodiment of the invention.

Referring to FIG. 5, a prospective cross-sectional view of a solids separation apparatus in accordance with an embodiment of the invention is shown at 500. A cross-section of pressure chamber 110 of FIG. 1 is shown with an inner chamber 528 and process ports 524 and 520. Inner chamber 528 receives compacted solids 512 through solids pressure regulator opening 510. Compacted solids 512 are compressed solids resulting from post-combustion material or flu gas material desublimating or condensing in a cold liquid and being pressed together by screw auger 514 inside of filter 516. Filter 516, may be a ceramic filter or a wire mesh filter with a filtering size between 2 microns to 70 microns. As the solids are compacted, liquid and gas is released from the solids and discharged through liquid discharge port 518 and gas discharge port 522. The solids pressure regulator may comprise a first and second mated valve 530 and 526 which control a speed by which solids 512 enter pressure chamber 528. The solids pressure regulator may additionally comprise an actuator 502 and an actuator arm 506. Actuator 502 may be pneumatic, hydraulic, hydronic, or a motorized actuator. Actuator 502 may comprise a pressure sensor for detecting a pressure placed on valve sections 530 and 526. The pressure sensor may be a strain gage device or other differential pressure device as is known in the art. Actuator 502 may be directly connected to actuator arm 506 and move arm 506 to control a back pressure that allows solids 512 to be compacted. Solids 512 when discharged into pressure chamber 528 may be melted to form a liquid 504 within chamber 528. Liquid formed by melting solids in chamber 528 may be liquid post-combustion materials or flu gas materials such as carbon dioxide, nitrogen, oxygen, or combinations of any post-combustion material condensed into a slurry. Liquid 504 within chamber 528 may be removed or transferred by way of process ports 520 and 524. Process ports 520 and 524 may also be used to obtain process temperatures, pressures, and content level readings. Temperature sensors, pressure sensors, level sensors, etc., may be used to obtain and continuously monitor process conditions within chamber 528. Heat may be intentionally transferred to solids within chamber 528 to melt solids and transfer heat from liquid from 518 before liquid 518 is returned to form more slurry. This may be accomplished by a refrigeration process or by direct heat transfer to the liquid or to a condenser of a refrigerated cooling process. Heat may also be collected by pre-cooling the post-combustion materials which are condensed into the slurry before adding the post-combustion materials to the slurry for condensation into a solid or desublimation.

Figure 6:
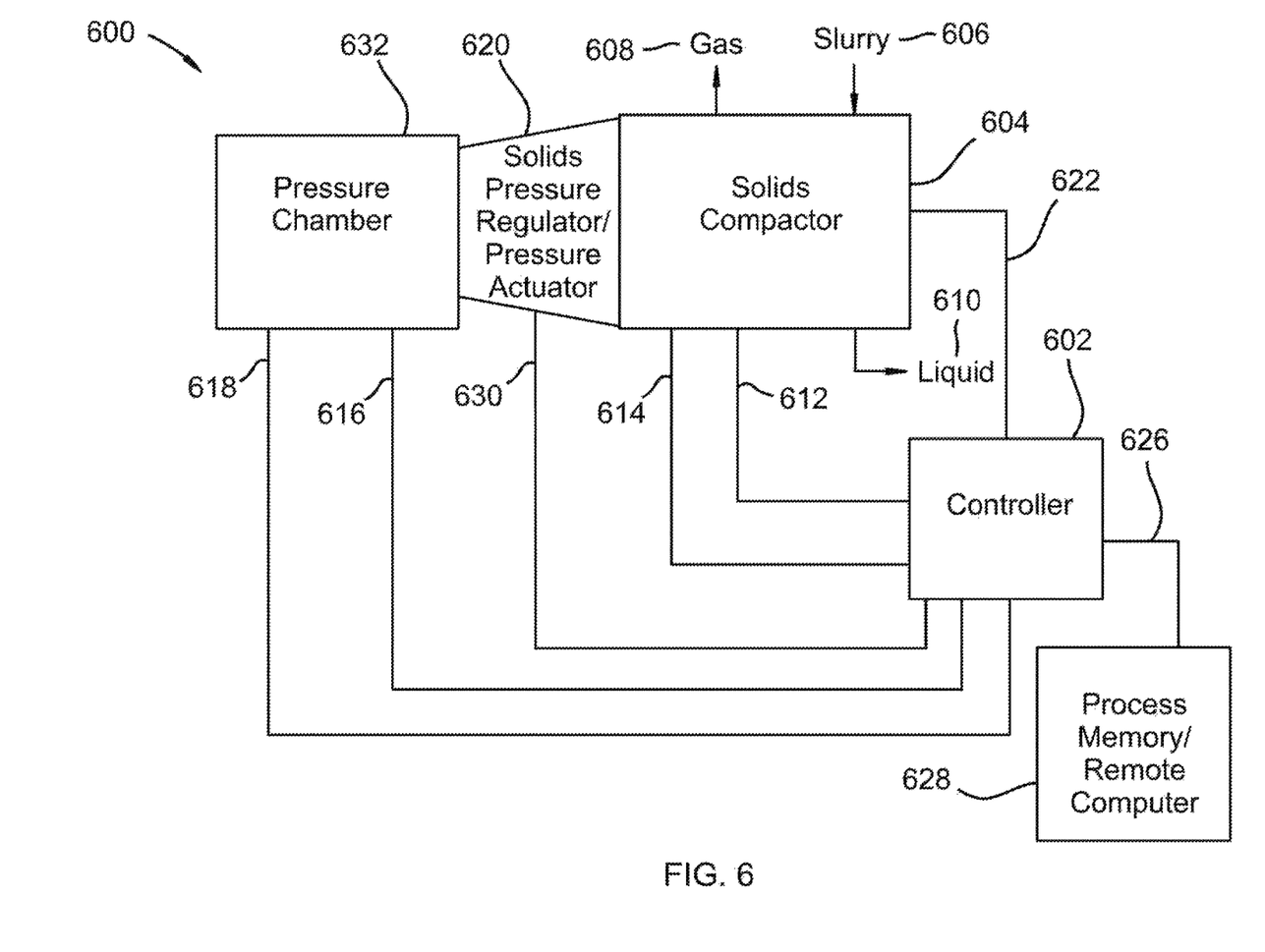
FIG. 6 is control chart of a method for solids separation in accordance with an embodiment of the invention.

Referring to FIG. 6, a process control diagram 600 is shown. A controller 602 may include memory, programming, communication ports, wireless communication controllers, processors, and necessary analog and digital inputs and outputs to control and operate a solids separation device according the invention. Controller may directly control a solids compactor motor or motor controller according to program instruction within controller 602 and/or within remote computer 628. Remote computer 628 may be a cloud based server application with memory and remote functionality, or any other remote computer system with internet or local area network connectivity. Solids compactor 604, pressure chamber 632, and solids pressure regulator 620 may provide multiple inputs 614, 612, 618, 616, and 630 to controller 602 for process control feedback and process monitoring. Controller inputs from solids compactor 604, pressure chamber 632, and solids pressure regulator 620 may include temperature, pressure, vibration, solids position, solids level, solids pressures at various points in the compactor, etc. Electrically controllable valves may be connected to gas output port 608, slurry input port 606, and liquid output port 610 as necessary for process control.

Figure 7:
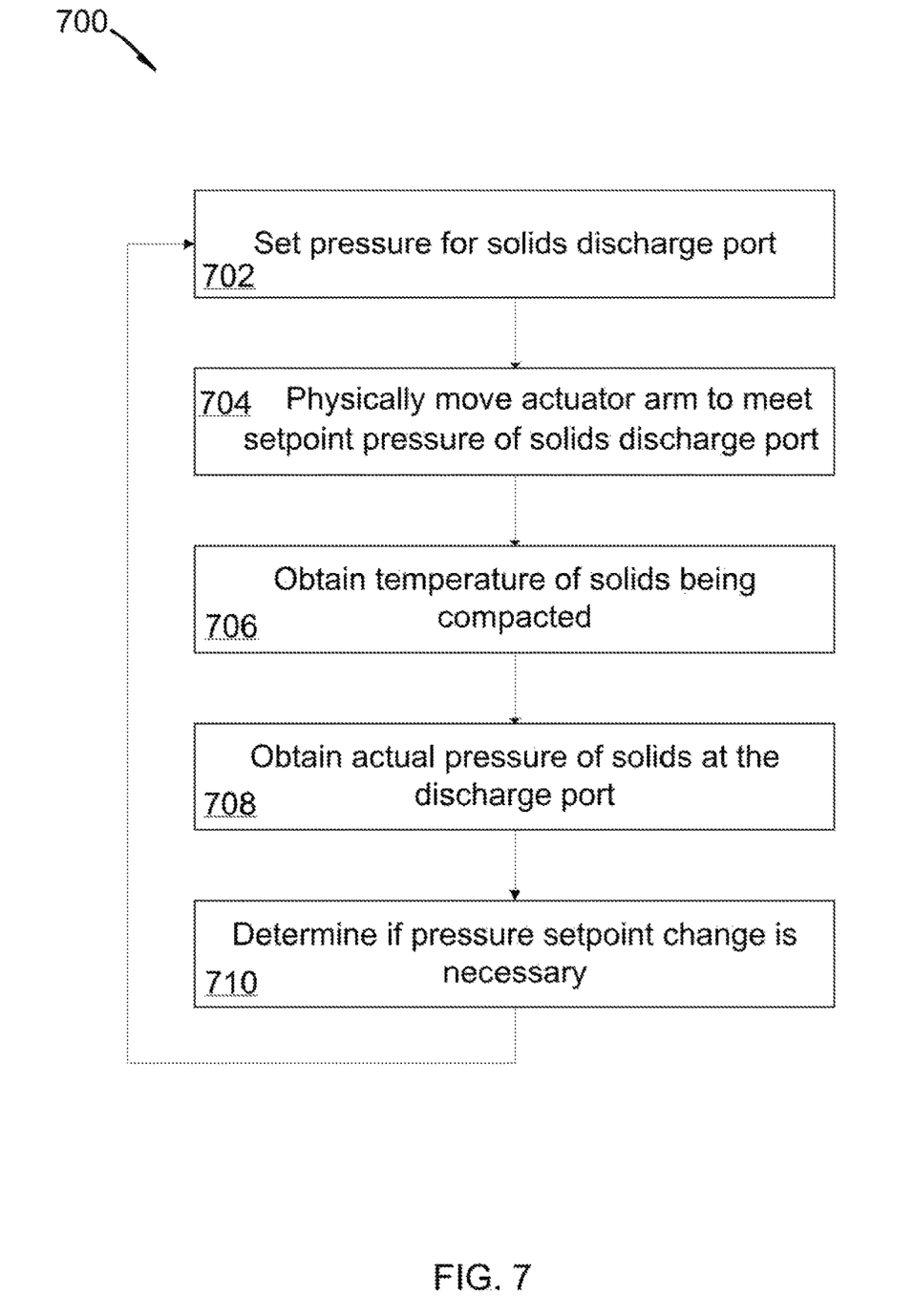
FIG. 7 is flow chart of a method for changing a solids discharge pressure setpoint in accordance with an embodiment of the invention.

Referring to FIG. 7, a flow diagram 700 contains process flow steps for setting and changing a solids discharge pressure in accordance with an embodiment of the invention. At step 702, a pressure is set for discharge of solids through a solids regulator located between a solids compactor and a pressure chamber. A pressure set point may be stored in memory associated with a controller or in controller memory. A pressure reading of a pressure applied to a solids regulator may be obtained by a pressure sensor attached to a pressure actuation mechanism or an actuator of the pressure regulator or a valve or valve surface of the pressure regulator. A pressure actuator may include motorized, hydraulic, pneumatic, hydronic, or spring actuators. At step 704, an actuator arm is physically moved to apply pressure or relieve pressure as needed to obtain a setpoint. If no solids are present at the regulator the regulator may be seated against itself at a setpoint pressure. At step 706, a compacted solids temperature is obtained. At step 708, a pressure is taken of the compacted solids at the solids regulator. At step 710 a determination is made to increase or decrease pressure at the regulator. A setpoint determination may allow the solids to stay in solid form on the filter side of the solids regulator based on pressure and temperature conditions within the compacted filter area.

Figure 8:
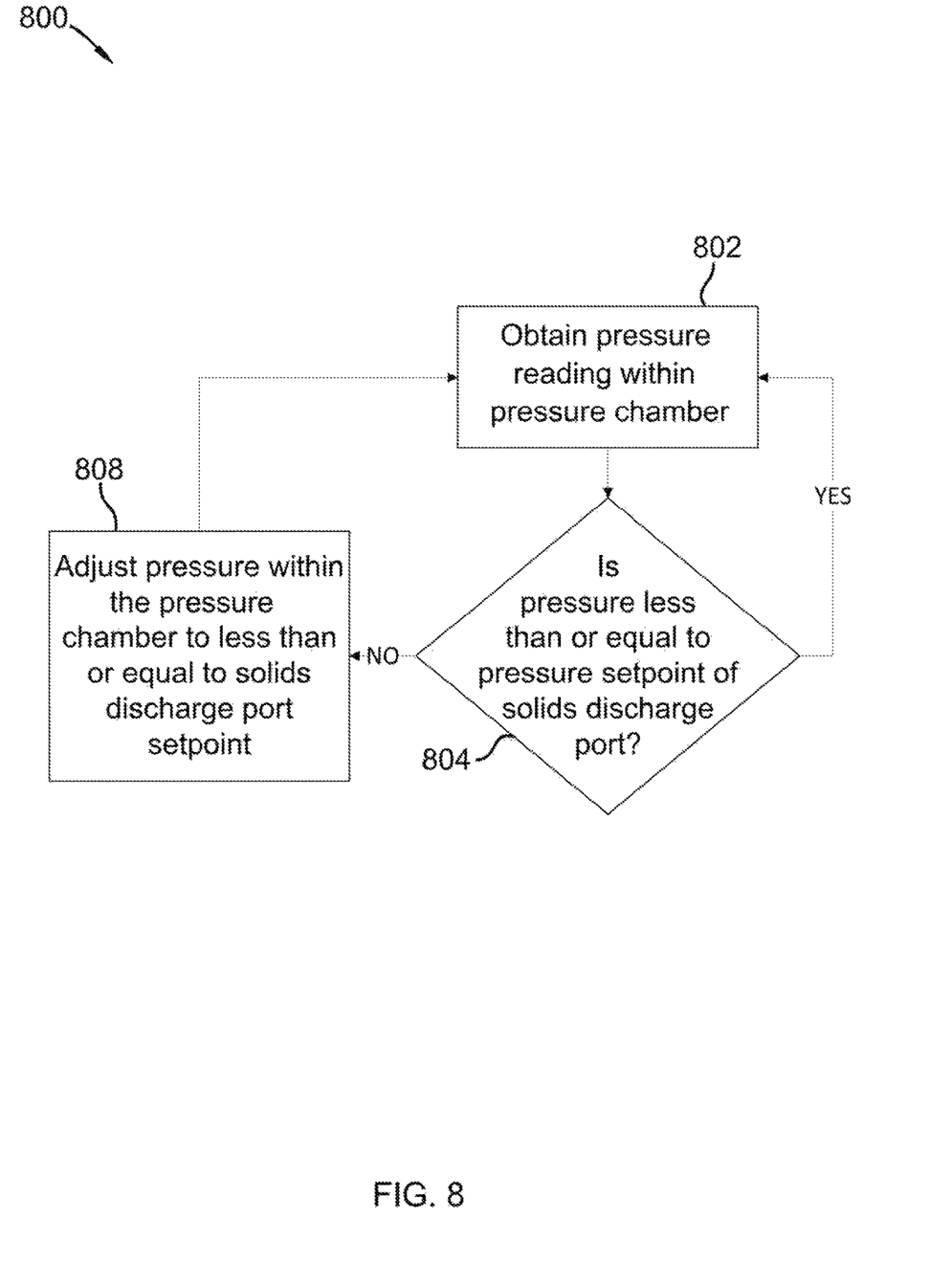
FIG. 8 is flow chart of a method for change pressure within a pressure chamber in accordance with an embodiment of the invention.

Referring to FIG. 8, a flow diagram 800 contains process flow steps for setting and changing a pressure within a pressure chamber in accordance with an embodiment of the invention. At step 802, a pressure and temperature is obtained from within a pressure chamber. At step 804, a comparison of internal pressure of the chamber to the solids discharge pressure is checked. At step 808, pressure is adjusted if higher pressure exists within the pressure chamber. Higher pressures may be a result of impurities within the chamber that need to be vented or as a result of excess heat transfer within the chamber.

Figure 9:
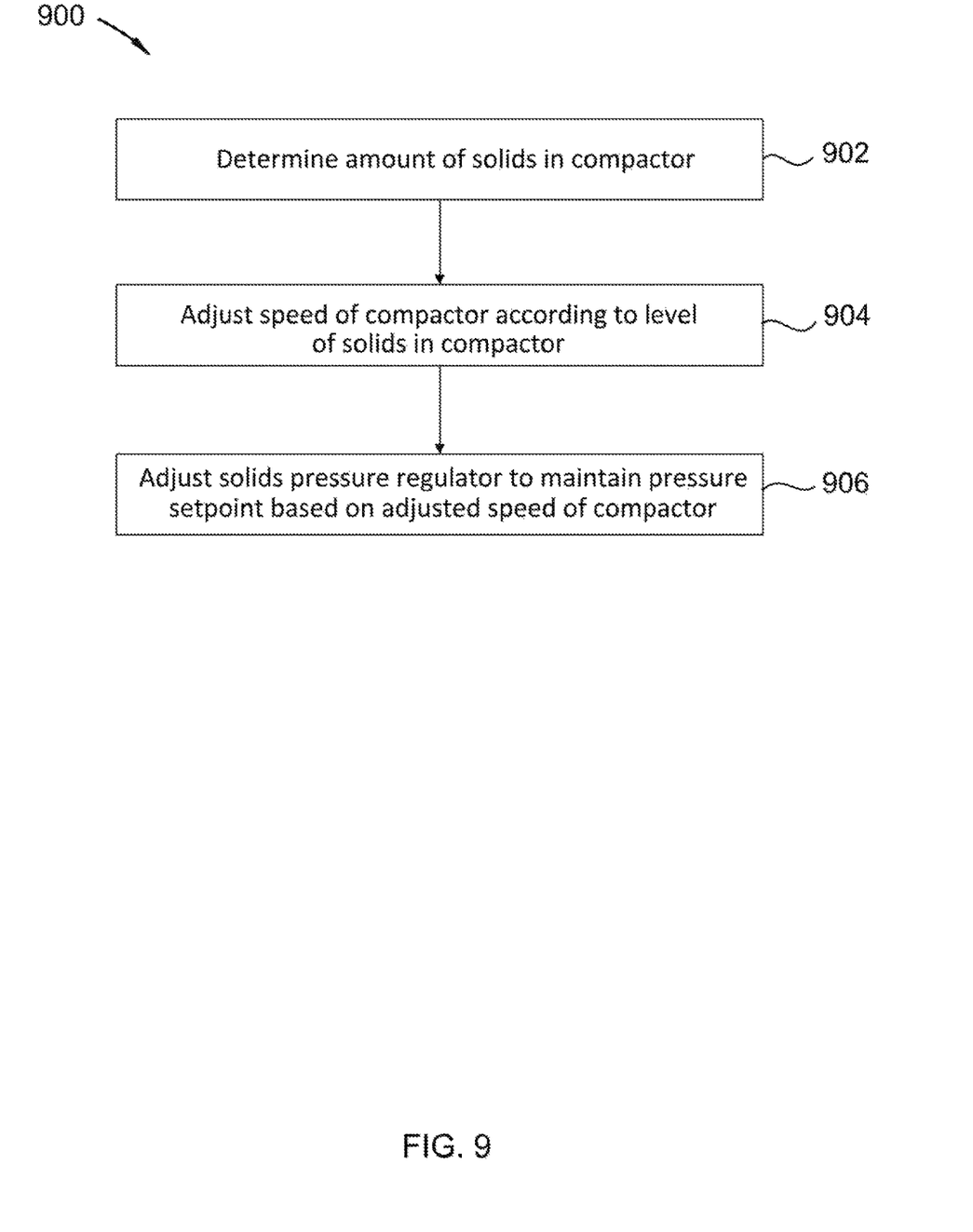
FIG. 9 is flow chart of a method for changing a setpoint of a solids compactor based on an amount of solids in the compactor in accordance with an embodiment of the invention.

Referring to FIG. 9, a flow diagram 900 contains process flow steps for adjusting a compactor speed base on an amount of solids in the compactor in accordance with an embodiment of the invention. In step 902, an amount of solids in the compactor is determined. This may be accomplished by temperature, pressure, vibration, ultrasonic, or optical sensors within the compactor or attached to the compactor, or by current or vibration sensors attached to the compactor motor. In step 904, a speed of the compactor may be adjusted faster or slower based on an amount of solids within the compactor or on a rated of slurry or density of the slurry entering the compactor. In step 906, the solids pressure regulator may be adjusted to based on temperature and pressure changes within the filer, due to the compactor running at a higher or lower speed.

Figure 10:
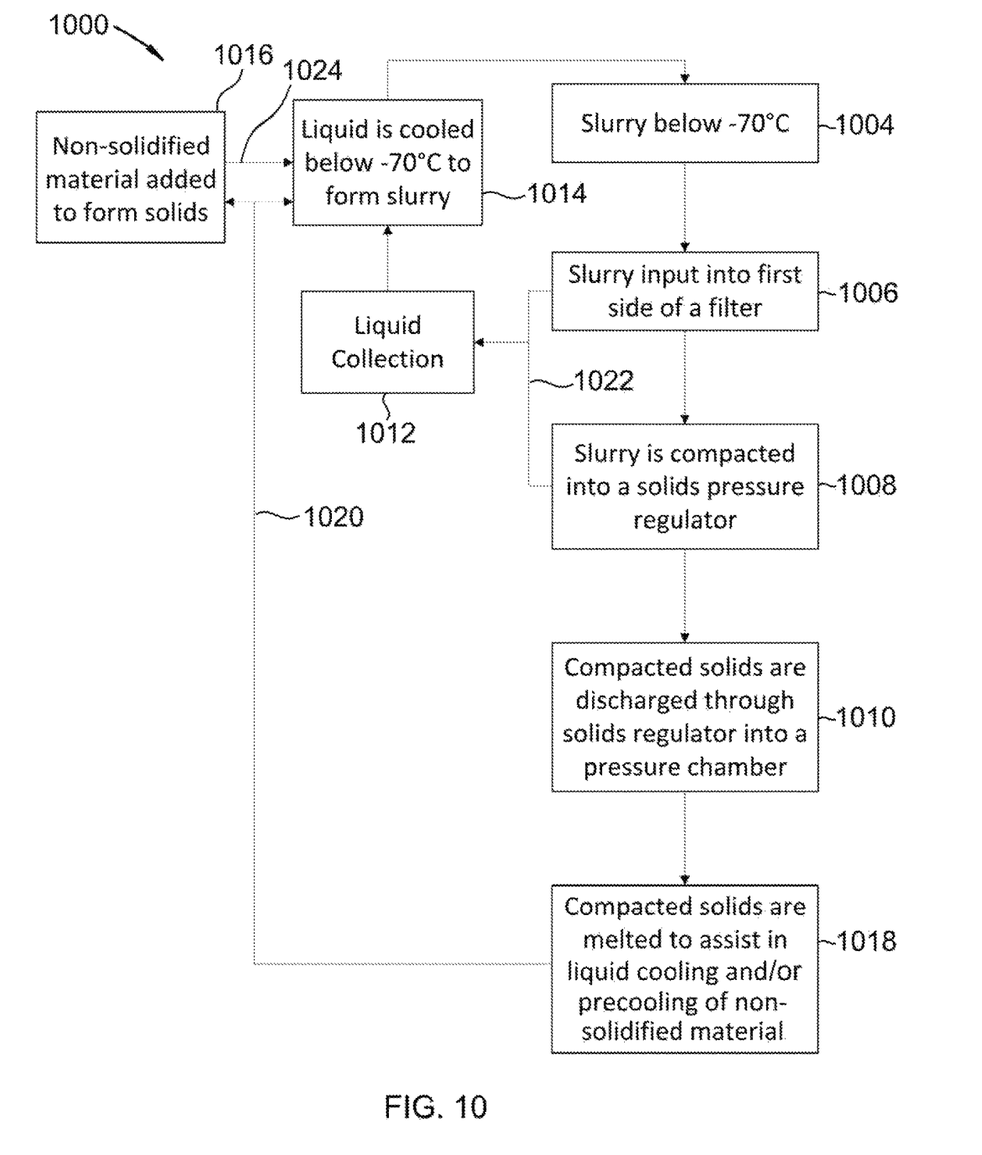
FIG. 10 is flow chart of a method for solids separation in accordance with an embodiment of the invention.

Referring to FIG. 10, a method flow 1000 for separating a solid from a slurry is described. At step 1016, non-solidified material such as post-combustion materials or flu gas materials are added to a cold liquid to form a slurry of condensed or desublimated solids formed from the post-combustion materials or the flu gas materials. The transfer of non-solidified material 1024 may be by way of a pipe or conduit. When the slurry is formed, and is below −56° C. at 1004 it is transferred to an input to a first side of a filter 1006. A transfer pipe or conduit may be insulated to help prevent heat transfer. At step 1008, the slurry is compacted in a solids pressure regulator until a predetermined or preset compacted solids pressure is reached. One the predetermined or preset pressure is reached the compacted solids are discharged through the solids regulator into the pressure chamber 1010. As the slurry is compacted liquids are released and collected 1012 and cooled and combined with the original cooling liquid used to cool the non-solidified material. At step 1018, solids are melted by heat transferred from a pre-cooling of flu gas material before being added to the cooled liquid 1014 and/or by heat transfer of a refrigeration cooling process of cooling liquid at 1014 or 1012. The cooling liquid or liquids may include liquids with low vapor pressures as are well known in the art.

The invention claimed is:

1. A method for separating solids and liquids comprising:
providing a first vessel comprising a solids compactor, a slurry inlet, a filter medium, a fluid outlet, and a solids outlet, wherein the filter medium is outside the solids compactor, the slurry inlet is located towards a first end of the first vessel, and the solids outlet is located towards a second end of the first vessel;
providing a second vessel in communication with the first vessel through the solids outlet;
passing a slurry stream, comprising a feed solid and a feed liquid, through the slurry inlet into the first vessel;
compacting the slurry stream with the solids compactor towards the second end of the first vessel, wherein compacting the slurry stream drives a portion of the feed liquid out of the slurry through the filter medium and out the fluid outlet as a liquid product stream, leaving a solids product stream in the first vessel;
passing the solids product stream out of the first vessel through the solids outlet into the second vessel; and
melting the solids product stream in the second vessel;
wherein, as the solids outlet restricts flow of the solids product stream sufficient for a backpressure to be built towards the second end of the first vessel, the solids compactor is enabled to compact the solids without the slurry stream passing through the solids outlet.

2. The invention of claim 1, wherein the feed solid comprises carbon dioxide.

3. The invention of claim 2, wherein the slurry is below a temperature of −56.6° C.

4. The invention of claim 1, wherein the filter medium is constructed at least partially from materials selected from the group consisting of mesh, stainless steel, metal, ceramic, carbon, fibrous materials, plastic, diamond, an interstitially formed material, and combinations thereof.

5. The invention of claim 1, wherein the filter medium is a sintered mesh filter with two or more mesh screens sintered together, each mesh screen having a filtering size between 2 microns and 70 microns.

6. The invention of claim 1, wherein the solids compactor is selected from the group consisting of screws, augers, pistons, tapered wedges, or combinations thereof.

7. The invention of claim 1, wherein the vessel further comprises a temperature sensor or a pressure sensor inserted into the slurry inlet.

8. The invention of claim 1, wherein the solids outlet comprises a tapered channel, an orifice, or a spring-loaded valve.

9. The invention of claim 1, further comprising adjusting an opening of the solids outlet to adjust the backpressure.

10. The invention of claim 9, wherein adjusting the opening of the solids outlet comprises movement of an actuator.

11. The invention of claim 1, wherein the second vessel comprises a gas outlet and the second vessel is maintained at a pressure by regulating discharge of gases through the gas outlet.

* * * * *